United States Patent [19]
Rouverol

[11] 3,938,865
[45] Feb. 17, 1976

[54] CAGELESS ROLLER BEARING
[76] Inventor: William S. Rouverol, 22 Lovell Ave., Mill Valley, Calif. 94941
[22] Filed: Apr. 1, 1974
[21] Appl. No.: 457,052

[52] U.S. Cl. ...................... 308/205; 74/462; 74/801
[51] Int. Cl.² .......................................... F16C 35/06
[58] Field of Search .............. 308/205; 74/462, 801

[56] References Cited
UNITED STATES PATENTS

| | | | |
|---|---|---|---|
| 230,884 | 8/1880 | Biscaccianti | 308/205 |
| 741,008 | 10/1903 | Brooks | 308/205 |
| 1,222,534 | 4/1917 | Cormier | 308/205 |
| 1,970,251 | 8/1934 | Rossman | 74/801 |
| 2,355,843 | 8/1944 | Best | 308/205 |

*Primary Examiner*—M. Henson Wood, Jr.
*Assistant Examiner*—Randolph A. Reese
*Attorney, Agent, or Firm*—Gordon Wood

[57] ABSTRACT

A roller bearing construction that eliminates the need for a cage or separator to align and position the rollers. Gear teeth formed on the rollers and races function as spaced apart planetary gear sets to insure correct roller alignment and spacing, reducing friction and wear and increasing load capacity.

30 Claims, 6 Drawing Figures

CAGELESS ROLLER BEARING

This invention relates to the construction of roller bearings. Specifically it discloses a method of utilizing gear teeth formed on the ends of the rollers and mating with teeth on the inner and outer races to maintain correct roller spacing and alignment. At least one of the sets of gear teeth comprises a miniature fine tooth planetary system that prevents the rollers from ever touching each other and makes a cage or separator entirely unnecessary. Since 85 to 95% of the friction, wear and heating in a roller bearing results from the rollers rubbing against the separator or the separator rubbing against one of the races (or in a needle bearing the rollers rubbing against each other), the cageless roller bearing herein disclosed affords major improvements in bearing performance. Also, since no separator is needed, the rollers can be spaced so there is only a few thousandths of an inch clearance between them; this allows several extra rollers to be introduced and increases the radial load capacity 25 to 40% as compared to a conventional roller bearing.

The object of the invention is thus the provision of a roller bearing with a longer service life, a lower operating temperature, a higher allowable speed and a greater load capacity.

Figure 1:
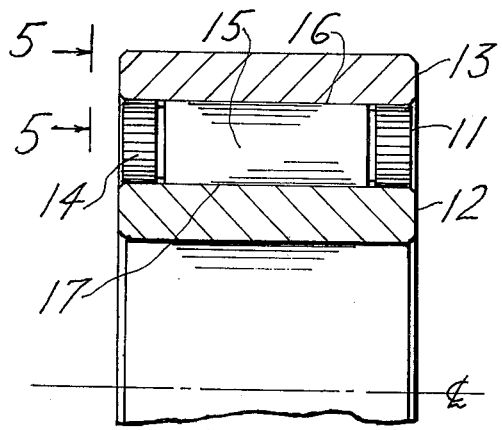
FIGS. 1 and 2 are half sections of cylindrical roller bearings taken in a plane containing the bearing axis.

In detail and referring to FIG. 1, a plurality of cylindrical rollers 11 are mounted between an inner race 12 and an outer race 13. Gear teeth 14 on both ends of each roller 11 are meshed with mating teeth on the inner race 12 and the outer race 13. The central portions 15, 16, 17 of the rollers 11 and races 12, 13 respectively, are ground smooth and carry the main radial load.

It may be noted in conjunction with FIG. 1 that of the four sets of gear teeth that may be employed on the races 12, 13 (two external and two internal, respectively), one is redundant and may be eliminated in the interest of less expensive fabrication and easy assembly. That is, if gear teeth are provided at both right and left sides of one race, only one set of teeth at the right or left side of the other race is needed to insure both proper spacing and alignment of the rollers.

Figure 2:
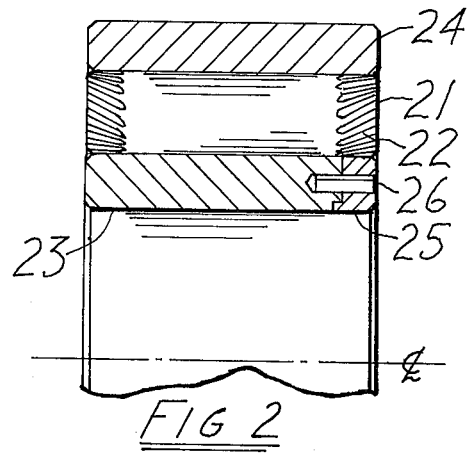

FIG. 2 is again a centerline section of a cylindrical roller bearing, but in this case the rollers 21 have helical teeth 22, preferably of opposite hand on opposite ends of the rollers 21. If both planetaries are complete (that is, both have an internal and an external gear), this type of bearing can carry moderate axial loads in either direction. However, if both planetaries are complete, assembly requires that one of the two races 23, 24 have a separable toothed lip 25, fixed as by one or more roll pins 26, to prevent rotation relative to the race portion 23 that carries the other set of teeth. In applications where there is axial load to be carried and the two portions of the separable race 23, 25 are not held together axially by shaft mounting fixtures such as washers or snap rings, shoulder screws should be used instead of roll pins 26.

Figure 3:
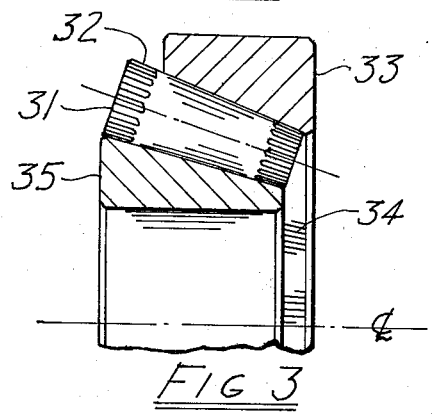
FIGS. 3 and 4 are similar views of tapered roller radial and thrust bearings respectively.

FIG. 3 shows a tapered roller bearing embodying the invention. In this type of bearing the teeth 32 on the rollers 31 are ideally straight or spiral bevel gear teeth, although for small taper angles sufficient clearance or backlash in the teeth will allow teeth of the "face gear" type to be employed. In the construction shown, only the small ends of the rollers 31 have a full planetary set, with mating teeth 34 on the outer race 33 as well as the inner race 35. Also, in this configuration the portion of the outer race 33 opposite the larger end of the rollers 31 has been eliminated, since it would have no function if it does not have any teeth. This is also true of the constructions of FIGS. 1 and 2 if only one planetary system is complete.

Figure 4:
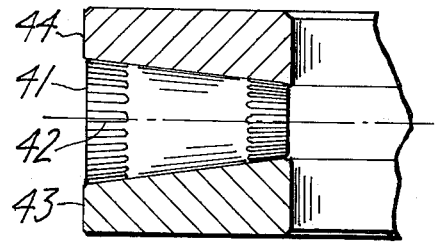

FIG. 4 shows a tapered roller thrust bearing wherein the rollers 41 have straight bevel teeth 42. The teeth could also be spiral bevel, if desired, and as in the construction of FIG. 2 the spiral angle should preferably be opposite and on opposite ends of the rollers 41. In this type of bearing, assembly is no problem, and neither the lower race 43 or the upper race 44 needs to have a separable toothed lip to permit assembly.

Figure 5:
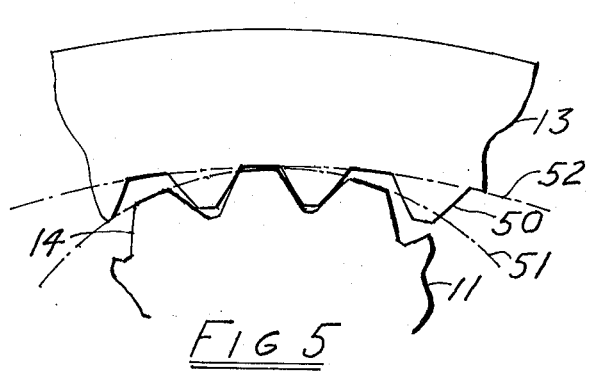
FIG. 5 is an enlarged partial end view of the bearing of FIG. 1, showing the mating teeth on the roller and outer race.

FIG. 5 shows an enlarged partial end view of the teeth 14 on the rollers 11 meshed with the teeth 50 on the outer race 13 of FIG. 1. The teeth shown in this figure are of a type that has considerable utility in this kind of bearing, in that no part of the teeth 14 on the rollers 11 projects beyond the roller pitch circle 51. Since this pitch circle 51 lies exactly in the same cylindrical surface as the rolling surface 15, there will be no tendency for the gear teeth 14, 50 to induce traction on the rolling surfaces 15, 16, since all velocities relative to the axis of the rollers 11 will be the same; and in addition, the avoidance of any tooth projections beyond the rolling surface 15 allows for inexpensive unitary construction of the races and avoids assembly problems. This kind of gearing is generally known as "all addendum," "all dedendum" or "full recess action" gearing. Other useful gear tooth profiles which may also be both non-conjugate and all dedendum are the Novikov, cycloidal and Vickers-Bostock-Bromley systems.

It should be noted in connection with FIG. 5 that the teeth 14, 50 are shorter and have higher pressure angles than standard 20° involute teeth. As the teeth 14, 50 do not transmit any appreciable power but serve only to maintain the spacing and alignment of the rollers, the optimum tooth form will be one that is nonconjugate, having most of its action near the pitch line so as to minimize friction. Teeth with circular arc profiles having a relative radius of curvature smaller than that of involute teeth (c.f., U.S. Pat. No. 3,438,279; U.S. Pat. No. 3,824,873, but having slightly different pressure angles to shift the center of the contact areas slightly away from the pitch line, are the optimum teeth. A high pressure angle, of at least 30° to 35°, is also desirable, since it reduces the sliding velocity between mating teeth and provides a tooth form that is especially well suited to roll forming. The teeth should also be quite fine, in the range from 48 to 200 DP.

Figure 6:
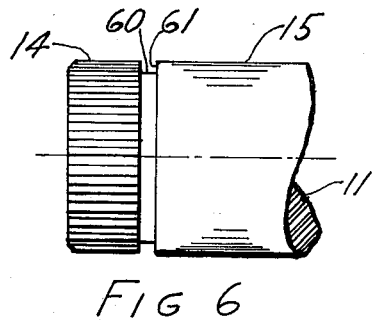
FIG. 6 is an enlarged view of one end of a cylindrical roller such as shown in FIG. 1.

FIG. 6 is an enlarged view of one end of a roller 11 such as shown in FIG. 1, indicating one means of preventing axial movement of the rollers. It will be noted that a groove 60 is provided between the teeth 14 and the load bearing portion 15. This serves two functions: It provides clearance for the end of the rolling die (or in small runs the shaping tool), and it provides a shoulder 61 against which the ends of the mating teeth on the races can bear to prevent relative displacement between rollers and races in the direction of the axis of the roller. It may be noted that in addition to this method of preventing axial displacement of the rollers, and to the above-mentioned method of using helical (or spiral) teeth, there is a third method which comprises providing a lip at both sides of one race, as is often done with conventional roller bearings.

In addition to the cylindrical (or needle) and tapered roller bearing types shown in FIGS. 1 through 4, it should be noted that the invention may be applied to spherical roller bearings, of both the cylindrical and tapered roller type. In these bearings the generating element of the rolling surface is not quite a straight line but has a slight camber. In this case the generating element can still be considered "substantially straight" and the gear tooth pitch surfaces selected to contain extensions of straight lines lying more or less equally inside and outside the cambered or "slightly barrel shaped" rolling surfaces.

The teeth on the rollers and races need not be of the same material. For example, if it is desired to make a bearing that is particularly quiet in operation, the teeth on the races may be made of plastic and molded onto the races. The use of molded plastic gear teeth (which if desired may also be used on the rollers) introduces enough resiliency into the system so that errors in effective rolling radii as a result of load changes or manufacturing tolerances will not induce any significant tractive forces on the rolling surfaces. Plastic teeth may be particularly useful in spherical roller bearing types, for this reason.

The advantages of a high helix angle in roller bearings embodying the invention should be noted. Angles in the range of 40° to 75° will minimize operating noise and provide the greatest axial thrust capacity, as well as being especially easy to roll form on conventional thread rolling equipment. Also, since the two planetary systems will normally have opposite hand helix or spiral angles, thrust loads ordinarily associated with steep helix or spiral angles are completely balanced out.

To avoid undesirable centrifugal effects the rollers should be evenly spaced about the bearing axis. This imposes certain requirements on the number of teeth that may be used on the races, but the limitations are fairly broad. All that is required is that the sum of the number of teeth on the sun (external) and ring (internal) gears of any complete planetary system be an even number and divisible by the number of planetaries (rollers).

The type of bearing herein disclosed is better suited to operation without lubrication than any other type of bearing. This is particularly the case if "Rolling Contact" teeth are used, if at least one set of each pair of mating gears is plastic, and if one of the various known surface films employed to prevent metal seizure is applied to the load-bearing surfaces.

Roller bearings embodying the present invention can be made using gear teeth that are not of the all-dedendum form, but the manufacturing cost of such constructions will normally be higher because at least one race or the rollers must be comprised of two or three separate parts (as in the case of the inner race 24, 25 of FIG. 2) to permit assembly.

It will be evident from consideration of the above specifications that the preferred forms of the invention shown in the figures combine two structural features. One is to use spaced-apart sets of gear teeth to insure roller alignment, the other to use at least one full planetary set to insure proper roller spacing. Either of these features may of course be used alone. For example, in FIG. 1, teeth could be provided on both ends of the outer race 13 and those on the inner race omitted. This construction may be used to prevent skewing of the rollers in a needle bearing, for applications where minimum friction is not essential and maintenance of roller spacing so as to prevent rubbing of the rollers on each other is not required. In this case the shaft may be used as the inner race.

In the ensuing claims, the term "pitch line" refers to an imaginary line lying in the plane of the axes of a pair of mating gears, all points of which line are removed from each of these axes by distances exactly proportionate to the number of teeth on each of said gears respectively. The term "pitch surface" means the surface of revolution generated by a pitch line as it moves about one of the axes of said mating gears.

The specific description given above the preferred form of the invention should not be taken as restrictive as it will be apparent that various modifications in design may be resorted to by those skilled in the art without departing from the scope of the following claims.

I claim:

1. In a roller bearing having a pair of circumferentially continuous races,
   a plurality of rollers in rolling engagement with said races,
   each of said rollers having a load bearing portion formed to a surface of revolution and a pair of spaced apart toothed portions,
   each of said races having a load bearing portion formed to a surface of revolution and a toothed portion, one of said races having two spaced apart toothed portions in meshing engagement with the toothed portions on said rollers,
   each of said surfaces of revolution having substantially straight generating elements,
   the pitch surface of each of said toothed portions containing straight-line extensions of said straight generating elements, the teeth of one of said toothed portions being formed to profiles contacting their mating tooth profiles substantially at the pitch line.

2. A roller bearing as in claim 1 wherein the teeth of one of said toothed portions are formed at an angle with respect to the pitch lines of said toothed portions.

3. A roller bearing as in claim 1 wherein the teeth of one of said toothed portions have active profiles which are entirely on one side of the pitch surface of said toothed portion.

4. A roller bearing as in claim 1 wherein said rollers are provided with a second surface of revolution disposed at an angle of at least 45° to said surface of revolution and engaged by a mating surface on one of said races, whereby axial movement of said rollers relative to said race is prevented.

5. A roller bearing as in claim 1 wherein the teeth of one of said toothed portions has a pressure angle greater than 20°.

6. A roller bearing as in claim 1 wherein the surface of revolution of said load-bearing portion of said rollers is cylindrical.

7. A roller bearing as in claim 1 wherein the surface of revolution of said load-bearing portion of said rollers is conical.

8. A roller bearing as in claim 1 wherein the surface of revolution of said load-bearing portion of said rollers is slightly barrel-shaped.

9. In a roller bearing having a pair of circumferentially continuous races,
a plurality of rollers interposed between said races,
each of said rollers having a load bearing portion formed to a surface of revolution and a toothed portion,
each of said races having a load bearing portion formed to a surface of revolution and a toothed portion,
each of said surfaces of revolution having substantially straight generating elements,
the pitch surface of each of said toothed portions containing straight line extensions of said straight generating elements, the toothed portion of one of said races having teeth the active profiles of which are entirely on one side of the pitch surface of said toothed portion.

10. A roller bearing according to claim 9 wherein each of said rollers has two spaced apart toothed portions and one of said races has two spaced apart toothed portions in meshing engagement with said toothed portions of said rollers.

11. A roller bearing as in claim 10 wherein the sum of the tooth numbers on said toothed portion of said pair of races is even and divisible by the number of rollers.

12. A roller bearing as in claim 10 wherein the teeth of one of said toothed portions are formed at an angle with respect to the pitch lines of said toothed portions.

13. A roller bearing as in claim 10 wherein the teeth of one of said toothed portions are formed to profiles contacting their mating tooth profiles substantially at the pitch lines.

14. A roller bearing as in claim 10 wherein said rollers are provided with a second surface of revolution disposed at an angle of at least 45° to said surface of revolution and engaged by a mating surface on one of said races, whereby axial movement of said rollers relative to said race is prevented.

15. A roller bearing as in claim 10 wherein the teeth of one of said toothed portions has a pressure angle greater than 20°.

16. A roller bearing as in claim 10 wherein the surface of revolution of said load-bearing portion of said rollers is cylindrical.

17. A roller bearing as in claim 10 wherein the surface of revolution of said load-bearing portion of said rollers is conical.

18. A roller bearing as in claim 10 wherein the surface of revolution of said load-bearing portion of said rollers is slightly barrel-shaped.

19. A roller bearing as in claim 10 wherein one of said races comprises two ring shaped segments and means are provided to prevent relative rotation of said two segments.

20. A roller bearing as in claim 10 wherein one of said races comprises two ring shaped segments and means are provided to prevent axial separation of said two segments.

21. A roller bearing as in claim 9 wherein the sum of the tooth numbers on said toothed portion of said pair of races is even and divisible by the number of rollers.

22. A roller bearing as in claim 9 wherein the teeth of one of said toothed portions are formed at an angle with respect to the pitch lines of said toothed portions.

23. A roller bearing as in claim 9 wherein the teeth of one of said toothed portions are formed to profiles contacting their mating tooth profiles substantially at the pitch lines.

24. A roller bearing as in claim 9 wherein said rollers are provided with a second surface of revolution disposed at an angle of at least 45° to said surface of revolution and engaged by a mating surface on one of said races, whereby axial movement of said rollers relative to said race is prevented.

25. A roller bearing as in claim 9 wherein the teeth of one of said toothed portions has a pressure angle greater than 20°.

26. A roller bearing as in claim 9 wherein the surface of revolution of said load-bearing portion of said rollers is cylindrical.

27. A roller bearing as in claim 9 wherein the surface of revolution of said load-bearing portion of said rollers is conical.

28. A roller bearing as in claim 9 wherein the surface of revolution of said load-bearing portion of said rollers is slightly barrel-shaped.

29. A roller bearing as in claim 9 wherein one of said races comprises two ring shaped segments and means are provided to prevent relative rotation of said two segments.

30. A roller bearing as in claim 9 wherein one of said races comprises two ring shaped segments and means are provided to prevent axial separation of said two segments.

* * * * *